July 6, 1926.  
G. G. FITCH  
BUTTONHOLE CUTTER  
Filed March 17, 1924
1,591,031
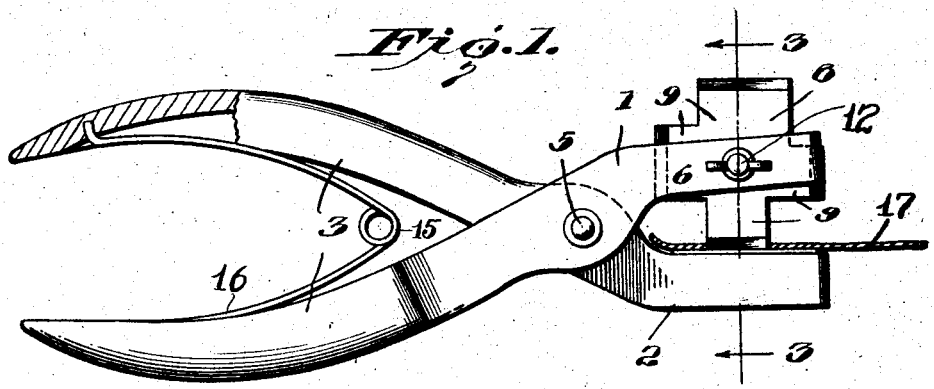
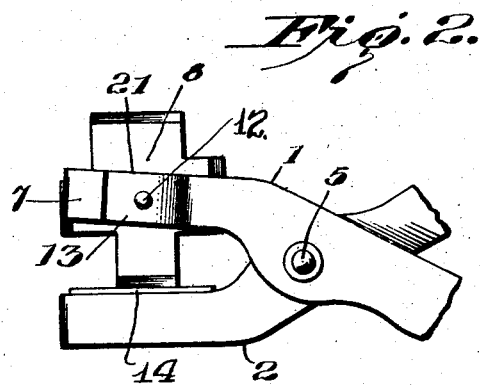
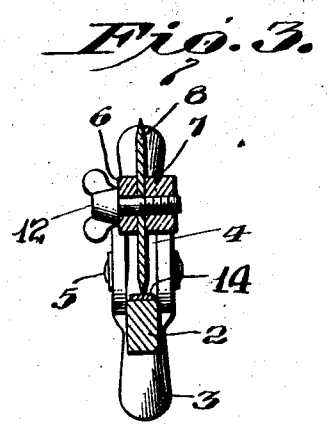
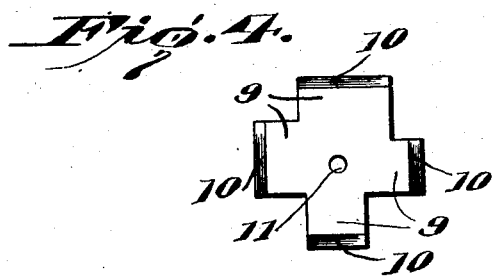
Inventor  
G. G. Fitch,  
By Milo B. Stevens  
Attorney Patented July 6, 1926.

1,591,031

UNITED STATES PATENT OFFICE.

GILBERT G. FITCH, OF EUREKA SPRINGS, ARKANSAS.

BUTTONHOLE CUTTER.

Application filed March 17, 1924. Serial No. 699,909.

My invention relates to cutters especially adapted for forming button holes although not necessarily restricted to such use.

An important object of the invention is to provide a device of the class described which is capable of cutting holes of different sizes.

Another object of the invention is to furnish a novel and improved means whereby the cutter can be securely clamped in a desired position.

A still further object of the invention is to provide a device of the character specified which is of highly simplified construction, strong and durable, highly efficient in its purpose, and which can be manufactured and sold upon the market at a very nominal cost.

Other objects and advantages of my invention will become apparent during the course of the detailed description appearing hereinafter.

In the accompanying drawing forming a part of this application, and in which like reference characters have been employed to designate similar parts throughout the several views.

Figure 1 is a side elevation of the device embodying my invention, a portion of one of the handles being broken away to illustrate the anchoring means of the spring member;

Fig. 2 is a fragmentary view in elevation showing the opposite side of the device to that shown in Fig. 1;

Fig. 3 is a vertical sectional view taken on the line 3—3 of Fig. 1, looking in the direction of the arrows, and Fig. 4 is a detail of the cutting element employed.

Referring specifically to the drawing, the device is comprised of the jaw members 1 and 2 and the handles 3. The member 1 is provided with a longitudinal slot as indicated at 4 through which the member 2 passes and which members are pivotally connected together as at 5. The slot 4 is continued through the forward portion of the member 1 but is greatly reduced slightly forward of the pivotal connection 5 to form the clamping jaws 6 and 7.

Between the jaws 6 and 7 is rotatably mounted a cutter 8 provided with a plurality of rectangular cutting blades 9 of varying sizes. The outer edges of the cutting blades 9 are straight and beveled to form cutting edges 10. The cutter 8 is also provided with a substantially centrally located aperture 11. While I have shown the cutter provided with four blades of varying sizes, it will be understood that as many blades may be employed as the exigencies of the case demand, and the same being preferably made of steel.

The jaws 6 and 7 are provided with openings for the reception of a winged screw bolt 12 which is provided with threads for a portion of its length. As will be noted from an inspection of Figs. 2 and 3, the jaw 7 is provided with a thickened reinforcing portion 13 at the opening therein. The opening in the jaw 7 as well as the opening in the reinforcing portion is threaded to receive the threaded portion of the bolt 12, and it is by this means that the jaws 6 and 7 are brought flatly into contact with either side of the cutter 8 to clamp the same in a fixed position.

On the upper face of the jaw 2 I have provided a plate 14 which is secured thereto by means of screws or any other suitable means, this plate being preferably formed from brass. The cutting edges of the blades 10 are adapted to bear against the plate 14 when the device is in operation.

Arranged between the handles 3 is a helical spring 15 provided with rearwardly extending arms 16, the terminal portions of which are extended laterally to provide branches anchored in sockets in the inner recessed sides of the handles 3, as shown in Fig. 1 of the drawing. The purpose of the spring 15 is to keep the jaws in spaced relation and in turn automatically space the respective cutting blade 9 from the plate 14 as pressure on the handles 3 is released. Thus it will be seen that as the button holes are formed in the goods it is not necessary to spread the handles apart as each hole is formed to disengage the cutting blade from the goods.

The material to have button holes formed therein is shown at 17.

The operation of the device may be briefly summarized as follows:

Assuming that the jaws are in non-clamping position and the cutter is freely rotatable therebetween, the cutter is rotated until the desired blade is presented. The winged bolt is now turned to bring the jaws 6 and 7 flatly in contact with either side of the cutter 8 to clamp the same in a fixed position. The material 17 is now placed on the plate 14 and pressure exerted on the handles 3 to cause the selected blade of the cutter to pierce the material to form a hole therein. As the pressure is released on the handles 3, the cutter 8 is automatically disengaged from the material through the action of the spring 15. The cutter may now be moved to the site of the next desired hole.

With reference to Figure 2 it will be observed that the spaced members formed by bifurcating the jaw 1 not only engage the body portion of the cutting blade, but also flatly engage opposite sides of those radial cutters which are horizontally disposed so that the active cutting blade is firmly held in place. In other words, the blade is engaged over a wide area and at points remote from the central portion thereof so that the blade will not wabble in use.

While I have described and illustrated what I now regard as the preferred embodiment of my invention, yet it will be distinctly understood that I do not propose to limit myself strictly thereto as various changes and modifications will immediately suggest themselves to those skilled in the art and which neither depart from the spirit of the invention nor the scope of the appended claim.

Having thus described my invention, what I claim as new and desire to secure by Letters Patent is:

A button hole cutter comprising a pair of pivoted jaws, one of which is bifurcated to form a pair of spaced members, a flat rotatable blade in the form of a cross positioned between said members and having a plurality of separate radial cutters, a pivot bolt extending through said spaced members and said blade and having a winged nut adapted to be tightened to force said spaced members into binding engagement with opposite sides of said flat blade and the opposite radial cutters to brace and firmly hold the blade in position, and a spring to urge said jaws to open position.

In testimony whereof I affix my signature.
GILBERT G. FITCH.